United States Patent
Rezkallah

(10) Patent No.: US 9,126,843 B2
(45) Date of Patent: Sep. 8, 2015

(54) METHOD FOR SEPARATION OF MONOVALENT METALS FROM MULTIVALENT METALS

(75) Inventor: Areski Rezkallah, Lezennes (FR)

(73) Assignee: Rohm and Haas Company, Philadelphia, PA (US)

( * ) Notice: Subject to any disclaimer, the term of this patent is extended or adjusted under 35 U.S.C. 154(b) by 92 days.

(21) Appl. No.: 13/469,826

(22) Filed: May 11, 2012

(65) Prior Publication Data

US 2012/0288426 A1 Nov. 15, 2012

(30) Foreign Application Priority Data

May 12, 2011 (EP) .................................... 11290223

(51) Int. Cl.
| | | |
|---|---|---|
| C01D 15/00 | (2006.01) | |
| C01F 5/00 | (2006.01) | |
| B01J 39/26 | (2006.01) | |
| C01F 5/30 | (2006.01) | |
| B01J 39/04 | (2006.01) | |

(52) U.S. Cl.
CPC .................. C01D 15/00 (2013.01); B01J 39/04 (2013.01); B01J 39/26 (2013.01); C01F 5/00 (2013.01); C01F 5/30 (2013.01)

(58) Field of Classification Search
USPC ................................ 423/179.5; 210/656–688
See application file for complete search history.

(56) References Cited

U.S. PATENT DOCUMENTS 2,980,497 A * 4/1961 Goodenough et al. ........ 423/181
4,243,641 A * 1/1981 Ishimori et al. ............ 423/179.5

FOREIGN PATENT DOCUMENTS

JP 2007237057 9/2007

OTHER PUBLICATIONS

Barry L. Karger, "An Introduction to Separation Science," John Wiley & Sons, New York, 1973, pp. 353-356.
"Diaion SK series", www.diaion.com/en/products/ion_01_lineup.html, (2008).
Rey, et al., "A new approach to dealing with high-to-low concentration ratios of sodium and ammonium ions in ion chromatography", J. Chromatography, vol. 804, No. 1-2, pp. 201-209 (1998).
Weiss, "Losungmittelstabile Ionenaustauscher auf Polymer-Basis", Git Spezial Chromatographie, No. 2, pp. 67-75 (1992).
Rona, et al., "Separation of lithium from dead sea brines by gel permeation chromatography", Talanta, vol. 20, No. 2, pp. 237-240 (1973).
Rocklin, et al., "Ion Chromatography of Monovalent and Divalent Cations", J. Chromatographic, vol. 27, No. 8, pp. 474-479 (1989).

* cited by examiner

*Primary Examiner* — Steven Bos
(74) *Attorney, Agent, or Firm* — Carl P. Hemenway; Tifani M. Edwards

(57) ABSTRACT

The present invention is directed to a new more environmentally friendly method for the separation of metals from concentrated solution or more specifically to separate monovalent metals from a solutions that comprise high levels of multivalent metals by using a sulfonic functionalized resin.

11 Claims, 6 Drawing Sheets

METHOD FOR SEPARATION OF MONOVALENT METALS FROM MULTIVALENT METALS

The present invention is directed to a method for the separation and recovery of monovalent metals from multivalent metals present in solutions that comprise high concentration of undesired cations by using a specific functionalized polymer.

The separation and recovery of lithium has been of particular interest in recent times. Salar de Uyuni is part of the Altiplano of Bolivia in South America. The Salar was formed as a result of transformations between several prehistoric lakes. It is covered by a few meters of salt crust, which has an extraordinary flatness with the average altitude variations within one meter over the entire area of the Salar. The crust serves as a source of salt and covers a pool of brine, which is exceptionally rich in lithium. It contains 50 to 70% of the worlds lithium reserves. The plateau includes fresh and saltwater lakes as well as salt flats and is surrounded by mountains with no drainage outlets. The Salar contains large amounts of sodium, potassium, lithium and magnesium (all in the chloride forms of NaCl, KCl, LiCl and $MgCl_2$, respectively but also sulfates), as well as borax. Of those, lithium is arguably most important as it is a vital component of various end use applications but in particular, electric batteries.

There are several known techniques for extracting lithium from lithium-containing materials. One such technique attempts to directly recover lithium from a brine solution with polycrystalline alumina. Pelletized polycrystalline alumina is used to selectively extract the lithium from a mixture that contains monovalent metals such as sodium, potassium and multivalent metals such as calcium, magnesium, barium and other species.

This technology presents several issues linked to the stability of the polycrystalline alumina material, such as leakage/losses of the material, instability of the process and sensitivity to other elements present in the brine such as magnesium. Furthermore, this technology is not advantageous because it is driven by the concentration of interfering elements such as magnesium. Moreover, the concentration of interfering multivalent metals, like magnesium, is also detrimental to lithium recovery as it impairs the performance of the media. Magnesium generates losses of lithium during the crystallization process (or precipitation) as magnesium combines with lithium to precipitate during the crystallization step. As the concentration of magnesium increases, the loss of lithium increases.

While the separation of these other interfering multivalent metals can be achieved physically by precipitation (concentration by evaporation) and lithium precipitation by addition of carbonate, the presence of elements such as magnesium perturbs the physical separation. In fact, magnesium co-precipitates with lithium as combined salts.

Consequently, the separation of other monovalent metals from multivalent metals is fraught with essentially the same problems as the separation of lithium and magnesium. In general, the same techniques for separation of lithium and magnesium can also be utilized to recover such other monovalent metals. Therefore, a discussion of the separation of lithium will be appropriate to illustrate the possibility of applying this technology for all such monovalent metals.

The present invention solves these problems of the art by separating the monovalent metals from the multivalent metals using a polymer which has a higher physical stability and avoiding the use of polycrystalline alumina. In a particular case, by way of non-limiting example, the invention aims at the separation of the element that perturbs the recovery of lithium (i.e magnesium). More widely, the invention is directed to the separation of monovalent metals from multivalent metals.

The present invention provides a method for the separation of monovalent metal from a multivalent metal concentrated solution comprising:

i) providing a sulfonic functionalized resin media
  ii) providing a concentrated solution comprising at least one monovalent metal and at least one multivalent metal;
  iii) passing the concentrated solution over the sulfonic functionalized resin media to separate the monovalent metal from multivalent metal; and
  iv) eluting the monovalent metal wherein the multivalent metal is present in an amount from 5 to 175 g/L.

As used herein the term "multivalent" includes species having two or more valences.

As used herein the term sulfonic functionalized resin is meant to include either a sulfonic resin or polysulfonic functionalized resins.

All range values included herein are inclusive and combinable. Furthermore all percentages used herein are by weight percent of total composition unless specified otherwise.

A more complete understanding of the present invention will be gained by reference to the accompanying Figures.

Figure 1:
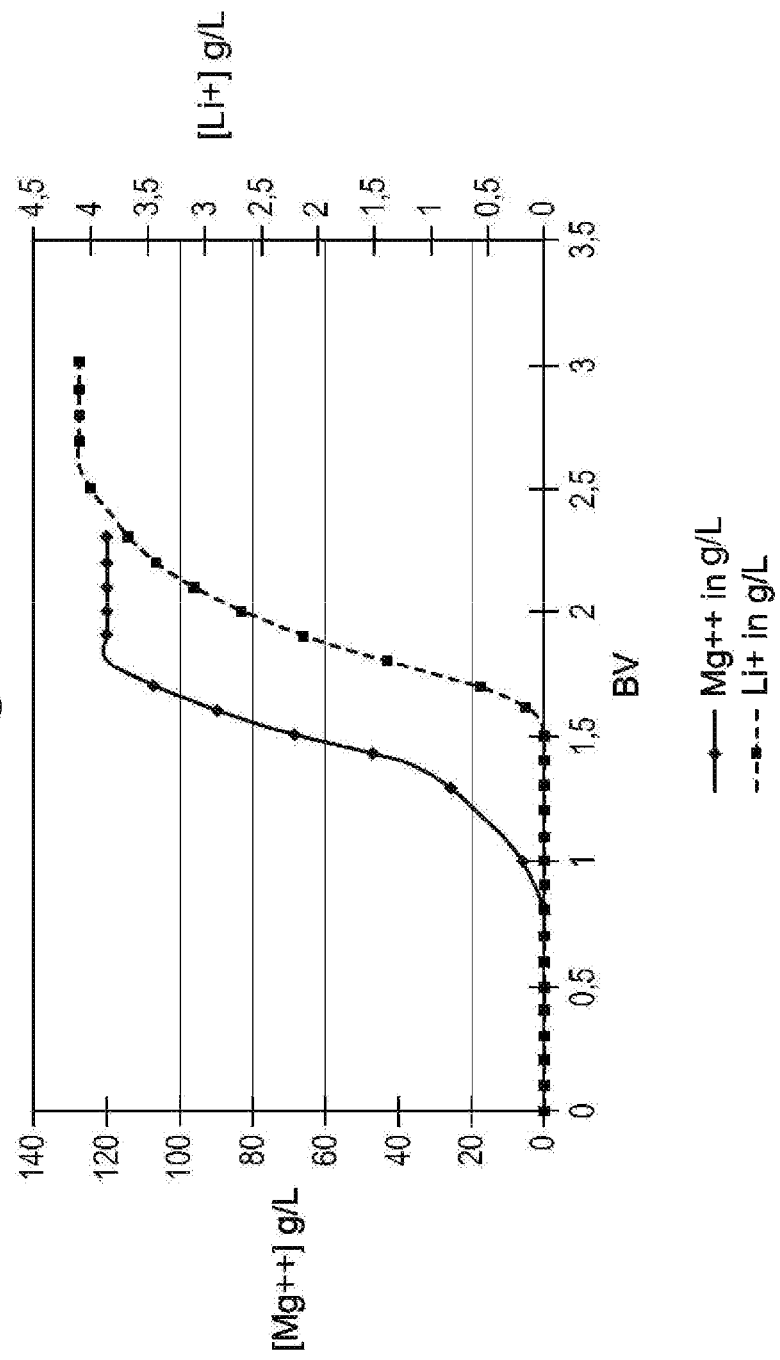
FIG. 1 is a graph of the loading profile obtained with AMBERLITE CR1310 resin when magnesium was separated from lithium.

The present invention has applicability for the separation of all valuable metals from a natural source (such as the salars) and also at the separation of the valuable metals from an artificial source, for example the recovery of lithium from used batteries. In this case lithium is often separated from cobalt and nickel.

The sulfonic functionalized resin is a styrene polymer resin having a sulfonic functional groups linked to the polymer matrix. The term "styrene polymer" indicates a copolymer polymerized from a vinyl monomer or mixture of vinyl monomers containing styrene monomer and/or at least one crosslinker, wherein the combined weight of styrene and cross linkers is at least 50 weight percent of the total monomer weight. The level of cross linking ranges from 4 to 10%. All percentages herein are weight percentages.

A crosslinker is a monomer containing at least two polymerizable carbon-carbon double bonds, including, such as for example, divinylaromatic compounds, di- and tri-(meth)acrylate compounds, and divinyl ether compounds. Preferably, the crosslinker(s) is a divinylaromatic crosslinker, such as for example, divinylbenzene.

The structure of the sulfonic functionalized resin can be either gel or macroporous (macroreticular). Alternatively, the sulfonic functionalized resin is in gel form. The term "gel" or "gellular" resin applies to a resin which was synthesized from a very low porosity (0 to 0.1 $cm^3/g$), small average pore size (0 to 17 Å) and low B.E.T. surface area (0 to 10 $m^2/g$) copolymer. The term "macroreticular" (or MR) or "macroporous" resin refers to a resin which is synthesized from a high mesoporous copolymer with higher surface area than the gel resins. The total porosity of the MR resins is between 0.1 and 0.7 $cm^3/g$, average pore size between 17 and 500 Å and B.E.T. surface area between 10 and 200 $m^2/g$. The sulfonic functionalized resin is it appropriate ionic form. The sulfonic resin may optionally be in sodium form.

The sulfonic functionalized resin is used to treat a relatively concentrated solution. As used herein concentrated solution may be a brine solution. The concentrated solution of the present invention comprises at least on monovalent metal. The monovalent metal may be a Group I metal, such as for example lithium. The multivalent metal may be a Group II metal, such as for example, magnesium. The monovalent metal is primarily present as a monovalent cation.

When the monovalent metal is lithium, it is present in the form of Li+. As used herein, the term lithium refers to all salt forms. Lithium is present in the concentrated solution in an amount from 25 to 20000 mg/L, alternatively from 1000 to 15000 mg/L, further alternatively from 1500 to 15000 mg/L, and further alternatively from 3000 to 8000 mg/L. Chloride ion and chloride complexes together as "chloride" and is present in the concentrated solution in an amount from 5 to 80 g/L and alternatively form 7 to 70 g/L and further alternatively from 15 to 50 g/L. The multivalent metal is present in an amount from 5 to 175 g/L, preferably 50 to 175 g/L.

The concentrated solution of the present invention may optionally contain a variety of other components. Such components include but are not limited to: iron, sulfate, chloride, nitrate, sodium, calcium, potassium, copper, phosphorus, and aluminum. The pH of the concentrated solution can range from 0 to 11, alternatively from 2 to 11. Furthermore, the concentrated solution may be obtained from any method commonly known to those of skill in the art including but not limited to in situ leach, heap, and leach.

The monovalent metals are separated from the concentrated solution by passing the concentrated solution over the sulfonic functionalized resin. Techniques commonly used in the art to separate the lithium from the concentrated solution may be applied. Such techniques include but are not limited to simulated moving bed (SMB), sequenced simulated moving bed (SSMB), carousel co-current or countercurrent compact or fluidized bed. The process may be discontinuous or continuous. Typically the flow rate within the column or packed bed system is from 0.5 to 50 BV/h.

Once the separation is complete, the monovalent metal may be precipitated by conventional crystallization processes known to those of ordinary skill in the art.

The method of the present invention differs from conventional chromatographic processes and is counterintuitive in that the multivalent metal cations, such as for example, magnesium are excluded and the monovalent metals such lithium are retained by the sulfonic functionalized resin. With the sulfonic functionalized resin, it is generally believed that, the selectivity for multivalent cationic species is higher than the selectivity for monovalent cationic species. It is known that the selectivity increases when the number of charges increases.

In the present invention, the phenomenon that is taking place goes against this currently accepted and well established theory in chromatography using a strong acid cationic resin as a chromatographic media. It is demonstrated with the present invention that the affinity for the monovalent metal, such as for example lithium, is higher than the multivalent metal, such as for example, magnesium. The following examples illustrate this phenomenon wherein the lithium is retained by the chromatographic media while magnesium is not retained despite a higher affinity for magnesium and a much higher concentration for magnesium that would favor the media saturation balance.

Despite the fact that the ion exclusion as well as the gel permeation chromatographies are known, none of these technologies revealed such behavior for such chromatographic media described in the present invention. The phenomenon that takes place could be seen as similar as gel permeation or size exclusion. But the phenomenon is more complex. If it was only a gel permeation phenomenon that is taking place, the same observation would have been made when the concentration of monovalent cationic specie lithium is decreasing.

In fact, it can be easily inferred that the phenomena that is taking place is linked to the diffusion rate of the elements inside the chromatographic media matrix. In fact, the monovalent cationic specie, lithium in the illustration case, has a faster diffusion velocity than the multivalent cationic specie, magnesium in the illustration case. Hence, the segregation of the monovalent from the multivalent cationic species becomes possible on the basis of their respective diffusion, their size being an inverse factor. Hence, the present invention may be even used for the separation of cationic metals having the same valence but different diffusion characteristic into the chromatographic media of the present invention.

The sulfonic functionalized resin retains the monovalent metal from the concentrated solution while the multivalent metal is not retained which allows for the separation and elution. An aqueous mobile phase is used to displace the cationic species from the chromatographic media. The mobile phase can be a solution of sodium chloride or any solution of salt that does not interfere with the recovery of the desired element. The mobile phase composition and concentration should be selected by techniques known to those of ordinary skill in the art. The nature of the salt use to make up the mobile phase is driven by the further step of recovery. The concentration choice is driven by the physical behavior of the chromatographic media. In fact, the chromatographic media shrinks as a function of the concentration of the salt in solution.

To following the separation, the monovalent metal is then recovered by elution. Methods of elution used by those of ordinary skill in the art are used herein. In one instance, for example, the monovalent metal retained by resin may be treated with a salt solution. Afterwards, the resin is eluted with a solution of sodium carbonate. The monovalent metal is then recovered from solution by known separations techniques, such as for example precipitation. It is beneficially found that the at least 10% of the monovalent metal found in the original concentrated solution may be recovered, alternatively 25%, further alternatively 90%. Within the pH range of 0 to 4 of the concentrated solution, monovalent metal recovery levels of up to 25% may be achieved.

In the following examples, the mobile phase or eluent is an aqueous sodium chloride solution. The process may be batch or continuous. No other chemicals are required nor is there a need for further regeneration; therefore this process is advantageously more environmentally friendly as compared to the processes of the art.

EXAMPLES

Laboratory Equipment Used

Jacketed glass column (height 100 cm, Ø 1.5 cm, fitted with sintered glass of porosity 1). Peristaltic pump with flexible tubings. 10, 100 graduated cylinder. 25 mL plastic flasks for samples collections. Stopwatch. Appropriate equipment for Lithium analysis (I.e: ICP). Standard laboratory glassware Concentrated solutions of the present invention may comprise for example:
  50 to 175 g/L of magnesium
  1 to 15 g/L of Lithium
  5 to 100 g/L of Sodium
  5 to 100 g/L of potassium
  0 to 100 g/L of sulphate
  0 to 100 g/L of chloride
  pH from 0 to 11
  Composition of the feed solution A in the Examples herein:
  Magnesium=122 g/l
  Lithium=4.1 g/l
  Sulfate=50 g/l
  Sodium=14 g/l
  Potassium=3 g/l
  Chloride=2 g/L
  pH=2.4
  Temperature: 23° C.
Composition of the Feed Solution B
  Magnesium=75 g/l
  Lithium=300 mg/l
  Sulfate=50 g/l
  Sodium=11 g/l
  Potassium=1 g/L
  pH=2.6
  Temperature: 23° C.
Determination of the Loading Profile The loading profile is one of the tests used to determine the separation performance. The test consists in injecting the solution that contains the metals to separate at a flow rate of 1 BV/h and to analyse continuously or fraction after fraction the composition of the outlet solution.

Resin used: AMBERLITE™ CR1310 resin. AMBERLITE™ CR1310 is a registered trademark of Rohm and Haas Company, a wholly owned subsidiary of The Dow Chemical Company. The resin is in sodium form having a polystyrenic matrix, crosslinked with divinyl benzene and containing sulfonic functional groups.

Note

The resin was converted in an appropriate ionic form (sodium for the examples) before carrying out the experiments.

Several fractions of the effluent were collected and analyzed by ICP (induction coupled plasma) photometry.

Example 1

FIG. 1 is the loading profile obtained with AMBERLITE CR1310 resin when magnesium was separated from lithium. Magnesium was leaking first while lithium was more retained. As aforementioned, contrary to conventional knowledge, the mechanism involved for the separation is not a simple ion exchange. In fact, because of higher affinity magnesium was expected to be more retained and hence leaking after the lithium.

Figure 2:
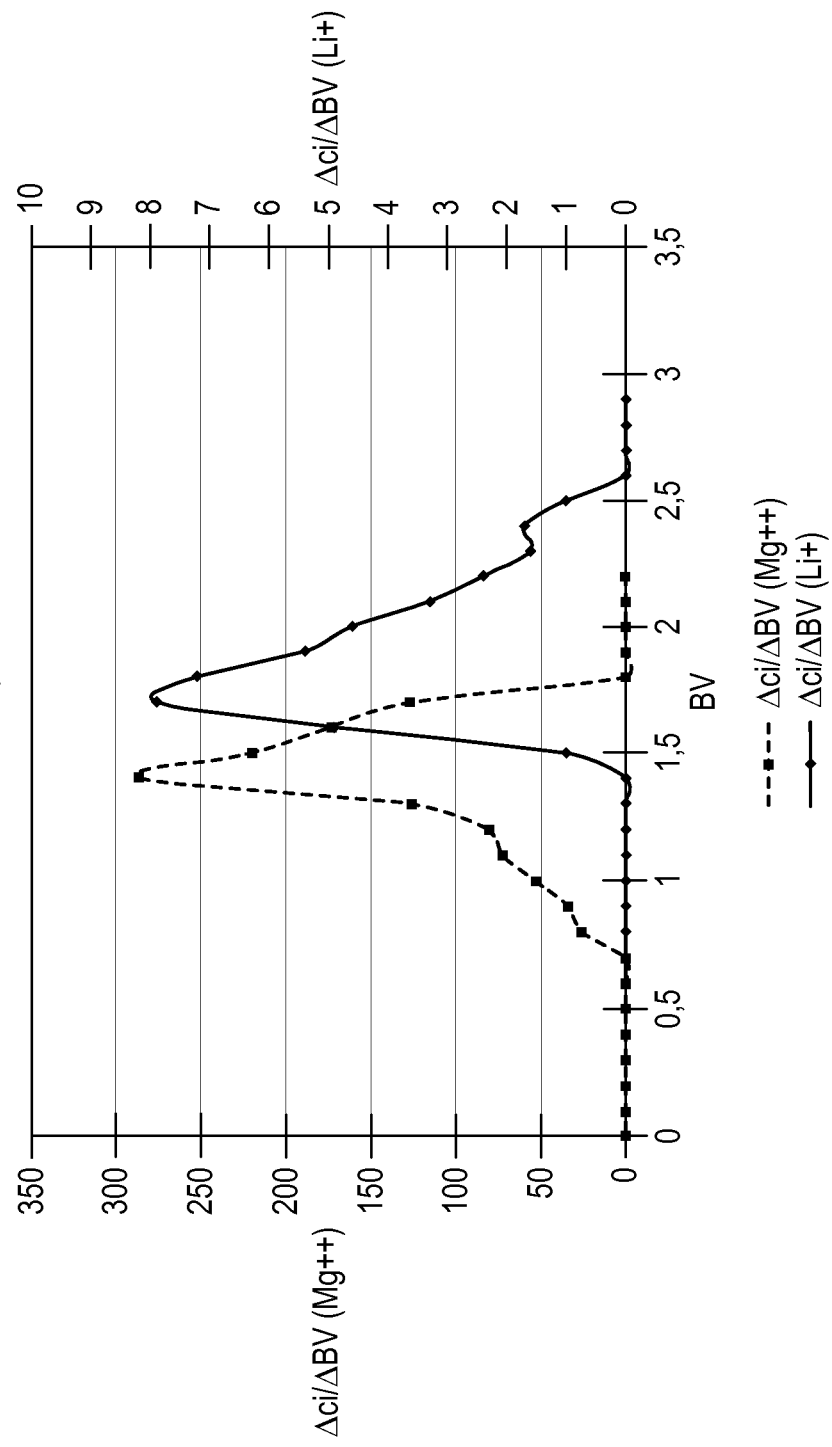
FIG. 2 is a separation derivative curve obtained from FIG. 1.

The separation derivative curve obtained from the loading curve is illustrated in FIG. 2.

From this curve the peak resolution is calculated using the following formula $$R = 2 \frac{(tr_{Magnesium} - tr_{Lithium})}{(\omega_{Magnesium} - \omega_{Lithium})}$$

Where "tr" is the retention time of the associated specie and "w" is the peak width of the associated specie. The retention time and peak width are measured in bed volumes.

The resolution equates 3.3 in the experimental conditions described previously which indicates a very good separation.

Example 2

Solution A was used. Analogue experiment (under the same experimental conditions as the experiment 1) was carried out with a different resin type of resin but same functional group (macroporous) AMBERLYST 40 resin, a registered trademark of Rohm and Haas Company, a wholly owned subsidiary of The Dow Chemical Company.

Figure 3:
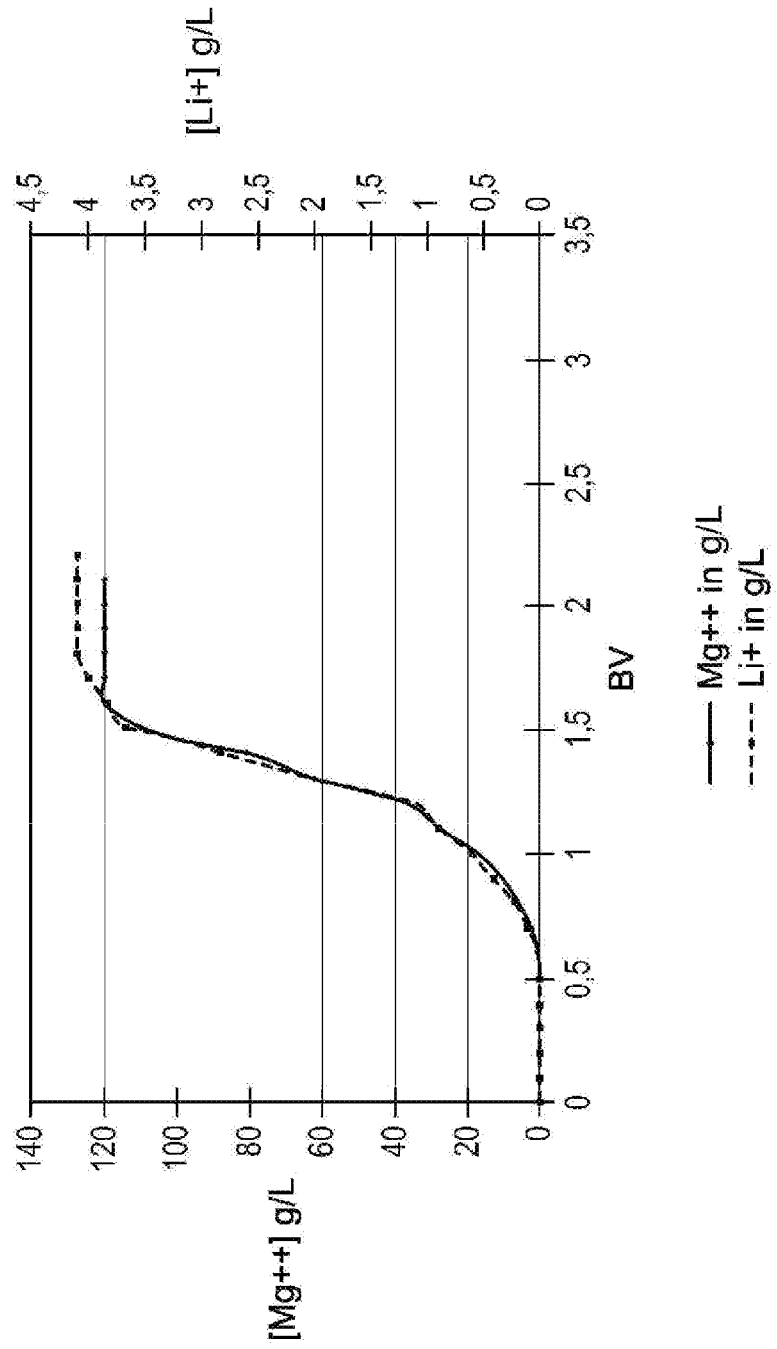
FIG. 3 is a graph of the loading profile obtained with AMBERLYST 40 resin when magnesium was separated from lithium.

The loading profile of AMBERLYST 40 resin displayed in FIG. 3 is different from the previous one and indicates that there is no retention of any specie like was previously observed with the AMBERLITE CR1310 resin.

Figure 4:
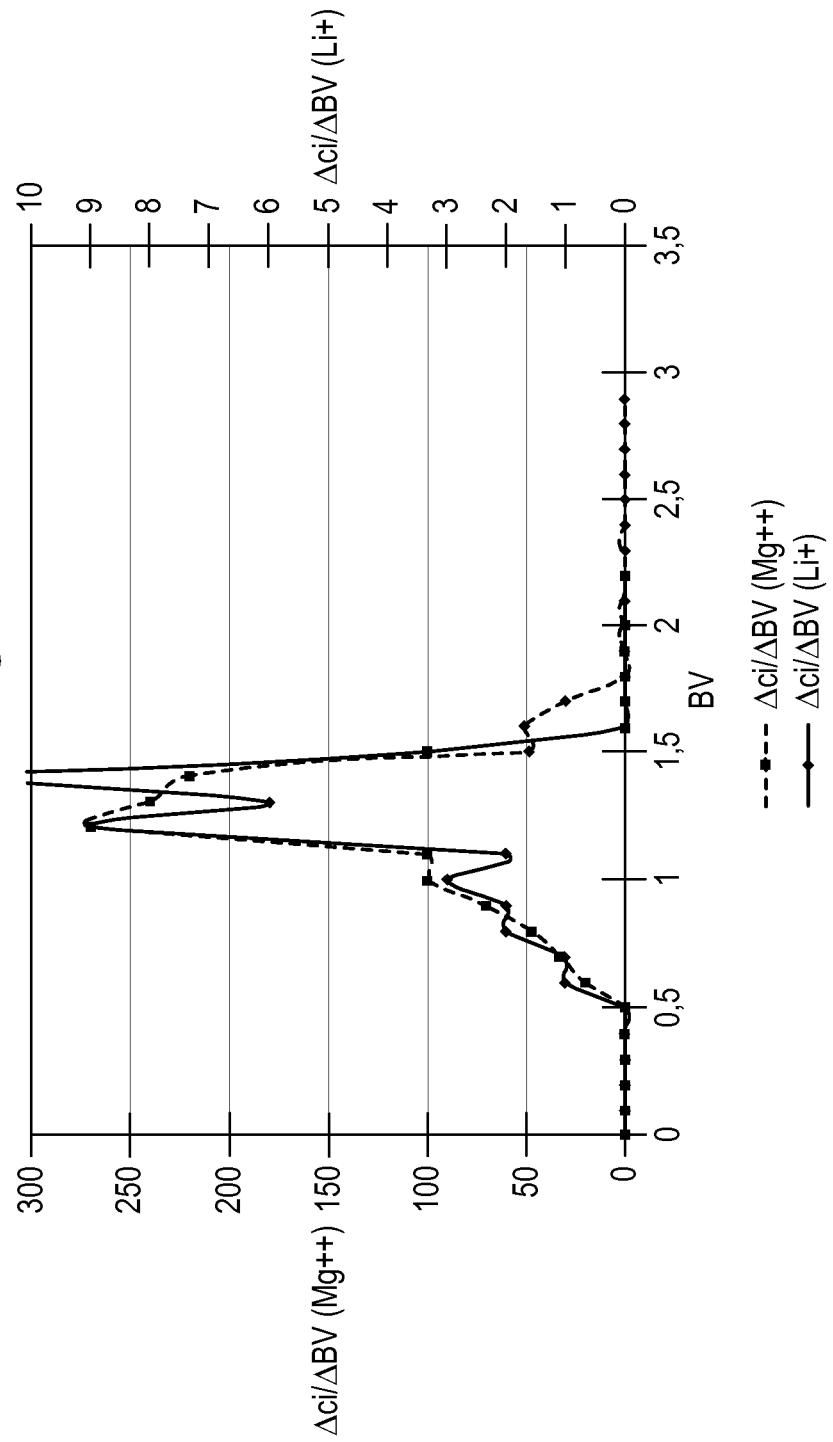
FIG. 4 is a separation derivative curve obtained from FIG. 3.

The separation derivative curve obtained from the loading curve of FIG. 3 is illustrated in FIG. 4. The resolution factor equates zero as there is no separation.

Example 3

The solution A was used for the test. The resin used is the DOWEX retardion 11A8, DOWEX is a registered trademark of The Dow Chemical Company. The resin is a chromatographic amphoteric resin.

Several fractions of the effluent were collected and analyzed by ICP (induction coupled plasma) photometry.

Figure 5:
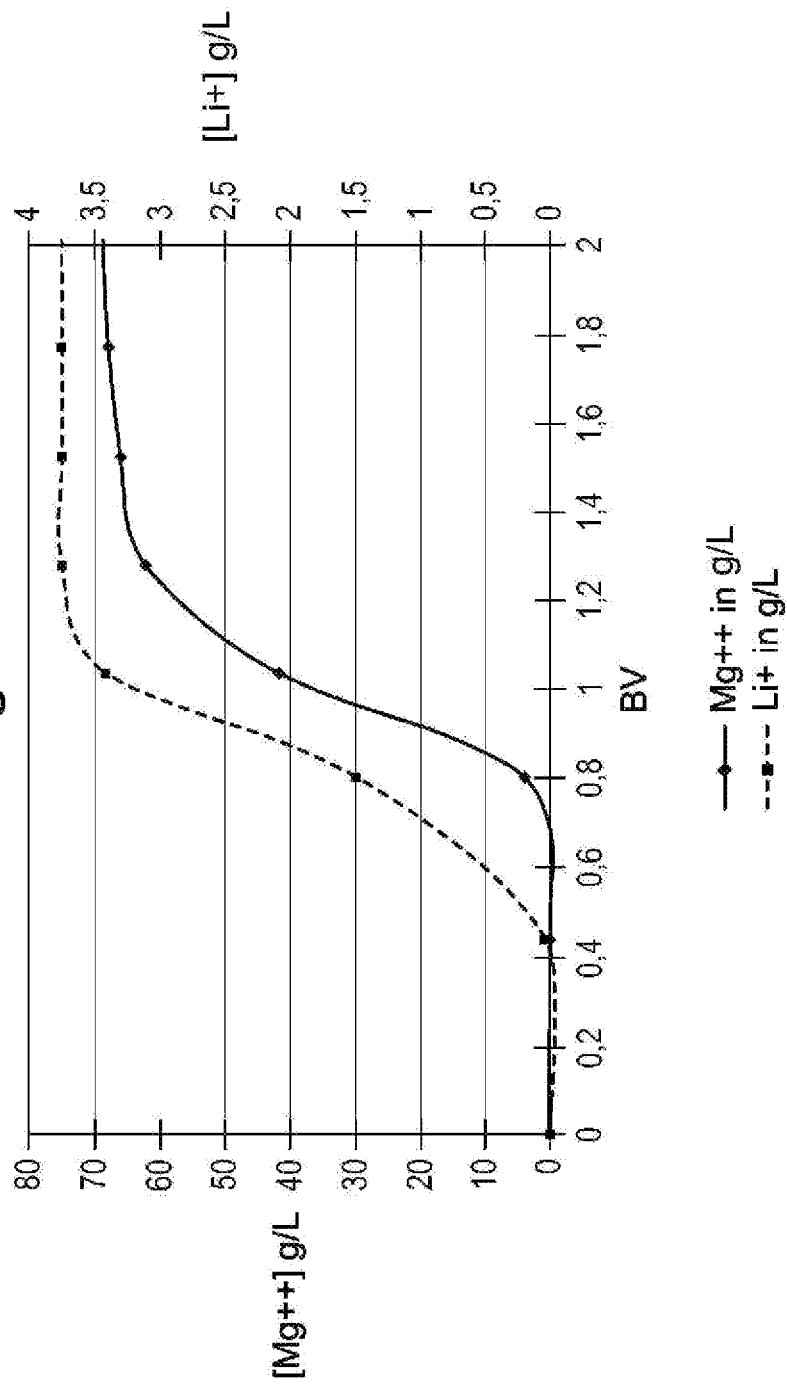
FIG. 5 is a graph of the loading profile obtained with DOWEX retardion 11A8 resin when magnesium was separated from lithium.

The loading profile obtained for DOWEX retardion 11A8 is shown in FIG. 5. The separation derivative curve obtained from the loading curve of FIG. 5 is illustrated in FIG. 6.

Figure 6:
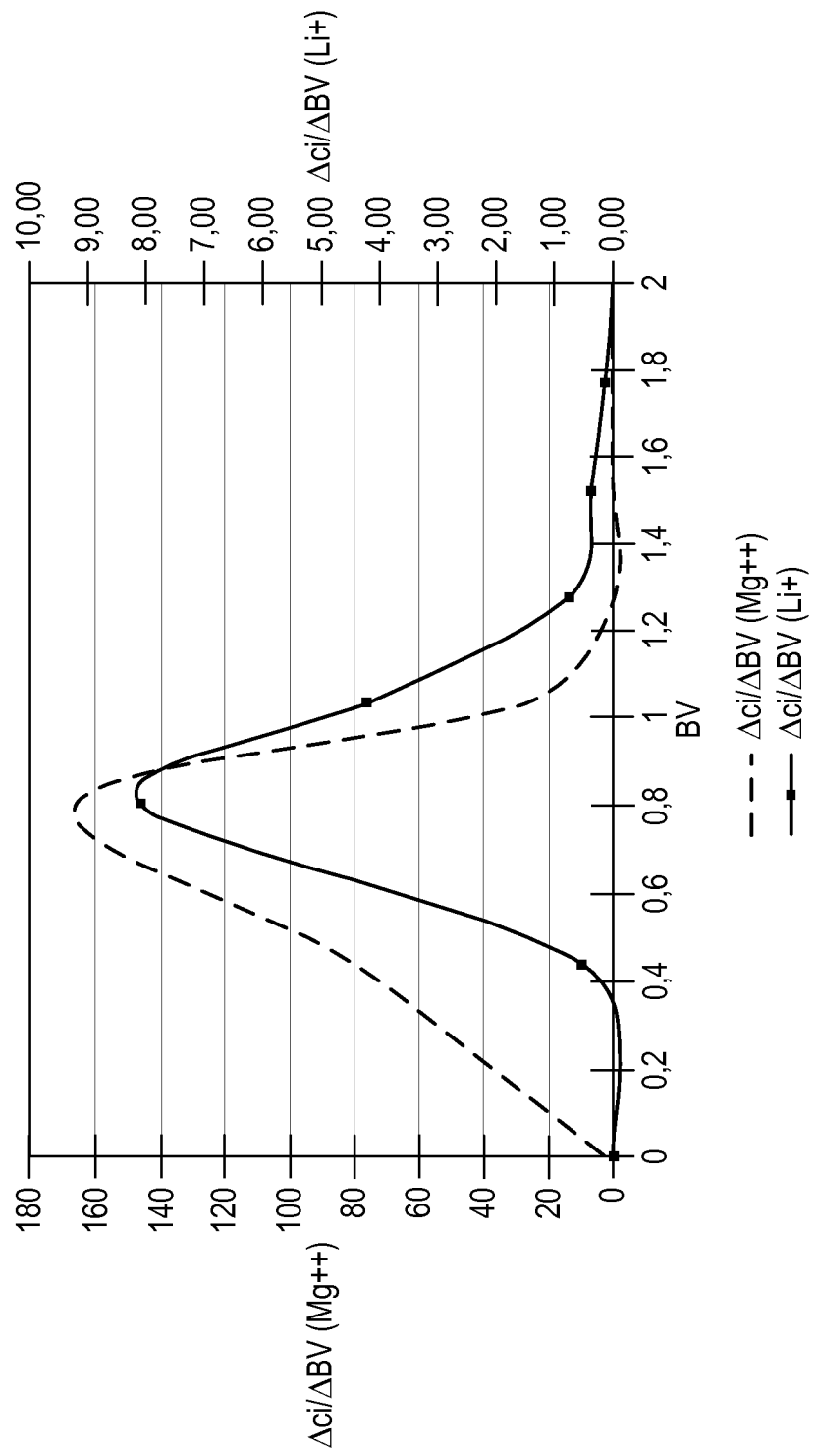
FIG. 6 is a separation derivative curve obtained from FIG. 5.

FIG. 6 shows that the separation of lithium from magnesium is not as good as the separation obtained during the experiment 1. The calculated resolution factor equates 0.2. The value is by far inferior to the value obtained in experiment 1 (R=3.3)

It is shown from examples 2 and 3 that the chromatographic media matrix formulation is extremely important as it is the key for the exclusion of multivalent cationic species and hence the retention of lithium.

The condensed matrix is then able to exclude bigger cations.

The chromatographic media matrix shrinks when the concentration of the solution is high enough. Such characteristic plays a role for the separation of cationic metals.

What is claimed is:

1. A method for the separation of monovalent metal from a multivalent metal concentrated solution comprising:
  i) providing a sulfonic functionalized resin media;
  ii) providing a concentrated solution comprising at least one monovalent metal and magnesium;
  iii) passing the concentrated solution over the sulfonic functionalized resin media to separate the monovalent metal from the magnesium; and
  iv) eluting the monovalent metal,
  wherein the magnesium is present in the concentrated solution in an amount from 5 to 175 g/L,
  and wherein the method is performed using a simulated moving bed.

2. The method of claim 1 wherein the monovalent metal is lithium.

3. The method of claim 1 wherein the concentrated solution comprises sodium.

4. The method of claim 1 wherein the concentrated solution comprises potassium.

5. The method of claim 1 wherein the functionalized resin media is in sodium form.

6. The method of claim 1 further wherein at least 25% of the amount of monovalent metal from the concentrated solution is eluted.

7. The method of claim 1 further wherein at least 90% of the amount of the monovalent metal from the concentrated solution is eluted.

8. The method of claim 1 wherein the concentrated solution has a pH of from 0 to 11.

9. The method of claim 2 wherein the concentrated solution comprises from 25 to 20000 mg/L lithium.

10. The method of claim 1, wherein said aqueous mobile phase is aqueous sodium chloride solution.

11. The method of claim 1, wherein the magnesium is present in an amount from 50 to 175 g/L.

* * * * *